US008340813B2

(12) United States Patent
Brown

(10) Patent No.: US 8,340,813 B2
(45) Date of Patent: Dec. 25, 2012

(54) SYSTEM AND PROCESS FOR REAL TIME MONITORING OF MAIL AND PRINT JOBS AND PROVIDING REAL TIME VERIFICATION OF MAIL PIECE COMPLETION

(75) Inventor: Christopher M. Brown, Lebanon, IN (US)

(73) Assignee: Allison Payment Systems, LLC, Indianapolis, IN (US)

( * ) Notice: Subject to any disclaimer, the term of this patent is extended or adjusted under 35 U.S.C. 154(b) by 778 days.

(21) Appl. No.: 12/234,385

(22) Filed: Sep. 19, 2008

(65) Prior Publication Data

US 2009/0073500 A1    Mar. 19, 2009

Related U.S. Application Data

(60) Provisional application No. 60/973,555, filed on Sep. 19, 2007.

(51) Int. Cl.
*B65H 39/00*    (2006.01)

(52) U.S. Cl. ...... 700/225; 700/226; 700/215; 270/52.02
(58) Field of Classification Search ............... 270/52.02; 700/215, 225, 226
See application file for complete search history.

(56) References Cited

U.S. PATENT DOCUMENTS

| 5,044,619 | A | * | 9/1991 | Sundquist et al. | 270/58.04 |
|---|---|---|---|---|---|
| 5,276,628 | A | * | 1/1994 | Schneiderhan | 700/223 |
| 5,745,590 | A | * | 4/1998 | Pollard | 382/101 |
| 5,748,484 | A | * | 5/1998 | Cannon et al. | 700/233 |
| 7,017,903 | B2 | * | 3/2006 | Fujii et al. | 271/298 |
| 7,433,072 | B2 | * | 10/2008 | Nishikawa | 358/1.18 |
| 7,537,203 | B2 | * | 5/2009 | DeWitt et al. | 270/52.01 |
| 2006/0284360 | A1 | * | 12/2006 | Hume et al. | 270/1.02 |

\* cited by examiner

*Primary Examiner* — Leslie A Nicholson, III
(74) *Attorney, Agent, or Firm* — Ice Miller LLP

(57) ABSTRACT

The present application relates to a system and method for tracking individual pieces within a printing or mailing job, as well as tracking completed trays, skids, or containers of printed documents.

9 Claims, 3 Drawing Sheets

SYSTEM AND PROCESS FOR REAL TIME MONITORING OF MAIL AND PRINT JOBS AND PROVIDING REAL TIME VERIFICATION OF MAIL PIECE COMPLETION

PRIORITY

This application claims priority to U.S. Provisional Patent Application Ser. No. 60/973,555 filed Sep. 19, 2007, the entirety of which is incorporated by reference herein.

BACKGROUND

This application generally relates to the tracking and production of print jobs and/or mailing of multiple component documents.

Printing and mailing of high quality financial documents, such as periodic billing statements, monthly invoices, DDA statements, coupon payment books, late notices, welcome notices and a host of other time critical printed or other materials is often performed by a third party for a financial entity. It will be appreciated that many of these print and/or mailing jobs requires multiple components to be printed, properly sequenced, and then packaged and mailed to a designated party in a timely manner. Further, the production of these time critical materials often requires complicated sorting and/or transformation of individual components into each product in a batch of products that will be shipped to a specific end user, often with each specific end user receiving a product that is slightly different from the other end products produced in the same batch. Since the information printed on each individual product, statement, or other individualized material is private, sensitive, and often time sensitive, each print job is preferably performed accurately, and any printing errors or sorting errors are preferably traceable. Since each printing and/or sorting job often requires the use of multiple different machines to process a job, tracing the print status for each document and/or job is a meticulous and difficult task that has proven to be difficult to implement.

In past systems, attempting to track each individual document/product or the status of a print job is located was accomplished by using a document counter and manually placing a tag on the ends of trays to determine the job number and first document number on the tray as well as the last document number present in the tray. Essentially, each individual page in a document or product that is added at each stage of production was added up, and every multiple of that sum was considered to be its own separate document. With a page counter or electronic eye counting each individual document passing through a production point, an individual document or product could be theoretically tracked through each station by knowing the number of the individual document or product in the sequence of print/process jobs, knowing the number of pages in a particular document or product at a particular place in the production of the document or product, and having the total page count of documents for a total batch or job that had passed a particular counter or electronic eye at a particular point. For example, if one knew that John Doe's zero coupon book was document number eight (8) in a batch of coupon books that are scheduled to each be ten pages each when they pass a first page counter or electronic eye, one could know that pages 81 through 90 should be John Doe's coupon book when it passes that first page counter or electronic eye.

However, when using this system, many assumptions have to be made that the print or processing procedure was perfect, and any documents that were pulled due to printing issues, customer request for removal, etc. would introduce errors into the tracking system, and could change the sequence and accuracy of the documents inserted in to each document or product in that batch, thereby ruining each individual document and potentially subjecting the mailer to the liability of exposing private information to the wrong individual. Therefore, as a set number of documents passed the page counter or electronic eye, usually in an amount equal to the number of packets that would fit on a tray or skid to be transferred to another processing station (a "bundle" or "tray" of documents or products), the first and last document in each tray or bundle was checked and be tracked by hand and recorded manually on a spreadsheet, with the completion of each job leading to the recording of the job as complete. Since progress for any given print or mail job was documented by hand, no real-time tracking of a print job was available, and tracking of machine down times and estimated mailing or delivery times had to be specifically requested and calculated on a per-job basis with additional man-hours devoted to such tracking.

DETAILED DESCRIPTION

The present application relates to a method and system for tracking print and/or mail jobs.

According to one aspect of the present application, tracking print or mail jobs allows a printer to track when a print file is received as a digital file, and allows the tracking and/or verification of each individual document or mail packet through the printing and/or mailing process, as well as verifying the completion of the entire printing job. In at least one exemplary embodiment, the tracking and/or verification of each individual document or mail packet may be tracked and numbered whether the document or job is processed on-site in one facility or transferred off-site to one or multiple locations to perform one or all processing requests for each document.

Figure 3:
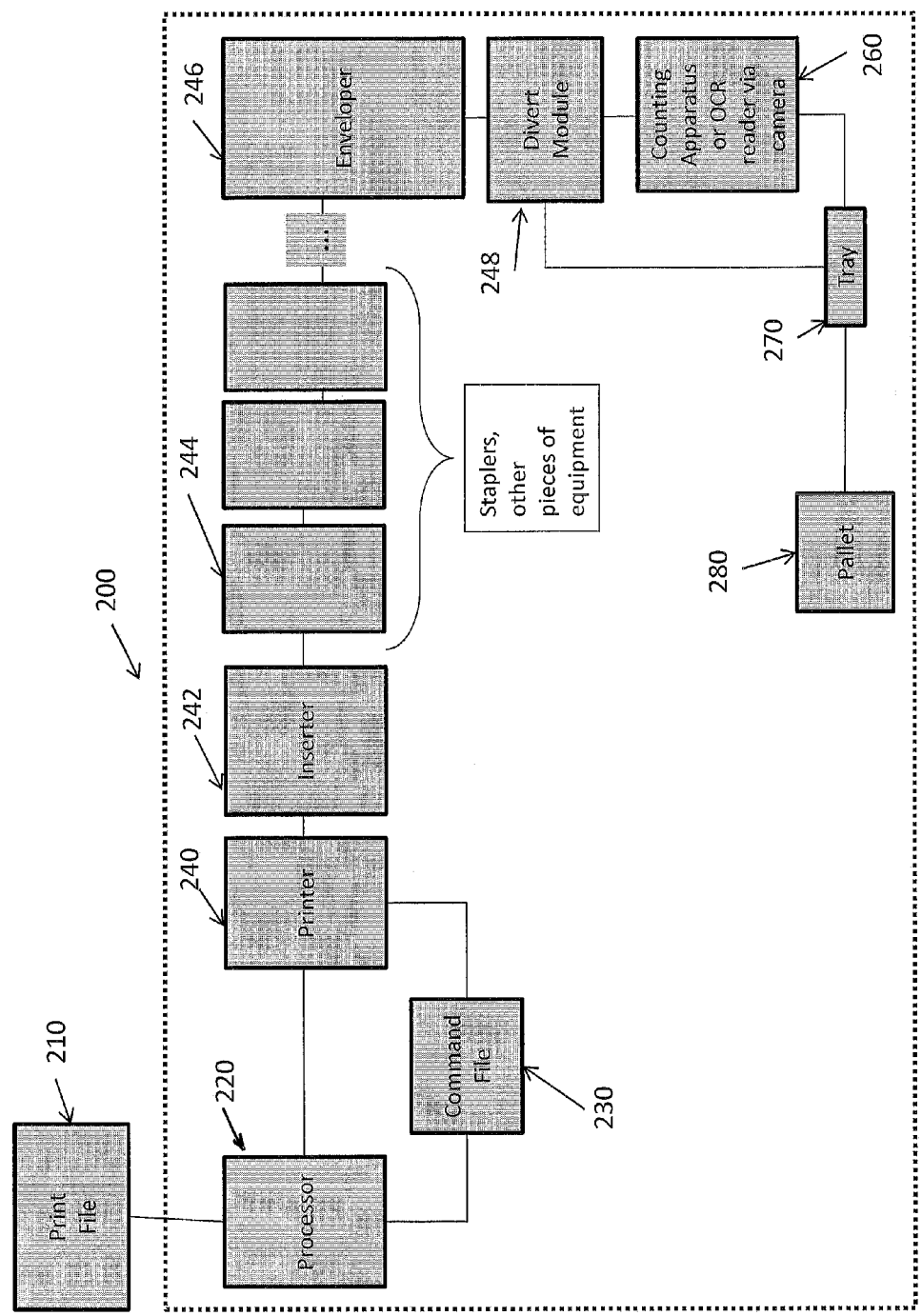
FIG. 3 shows an automated processing system for monitoring document production jobs according to at least one embodiment of the present disclosure.

According to at least one exemplary embodiment as shown in FIG. 3, an electronic file 210 is sent by a party requesting printing, processing, and/or mailing service from a service company, and the print file 210 is received electronically by the service company, specifying work to be produced (such as a "print job" or "mail job"). In at least one embodiment, each print job or mail job comprises multiple individual documents that may share similar individual pages or elements, but wherein each individual document is personalized with information, pages, and/or elements specifically produced for a particular individual or recipient. As an option, each electronic file specifically indicates the personalized information, pages, and/or elements of each document or product within the print job or mail job.

Optionally, as shown in FIG. 3, an automated processing system 200 identifies the electronic file 210 and details the customer requesting the printing service, and outlines the expected product to be produced. By extracting data from the electronic file 210, the automated processing system 200 optionally generates a command file 230 within the service company's command database. The command file 230 outlines the details of the print job or mail job, and optionally includes the estimated start and finish time for a particular print job or mail job. Among other details, the command file 230 optionally includes information such as the print machinery that must be used for each step in the print job or mail job process, the data for each discrete document, product, or print media being produced, as well as the sequence in which the discrete document, product, or print media (a "piece") will fall within the print job, and the sequence in which a tray 270 containing multiple discrete pieces will travel through the service company and/or the premises of third parties from the start of the print job or mail job to the finish of the print job or mail job.

Once the command file 230 is created, the printing company may optionally track each print job or mail job on a database that tracks each discrete piece within the print or mail job. For example, as each piece is directed through a particular machine (e.g., a printer 240, inserter 242, stapler 244, etc.), an electronic eye or other counting apparatus 260 counts each sequential piece that is run through the machine, verifying that each sequential piece has been treated as indicated within the command file 230. A counting apparatus 260 may include any device that can count either marked or unmarked pages or specific pages within a piece. If a machine malfunctions such that a particular piece or a portion of a piece must be removed from the sequence and handled manually, or if a customer requests removal of a particular piece in sequence, the piece may optionally be removed from the sequence with the tracking database updated accordingly.

According to at least one optional embodiment, a two dimensional barcode may be printed on each piece, or an optical character verification system 260 can be used to identify the piece and/or job and sequence number of the piece. For example, if each piece within a print or mail job is marked such that a particular page in each piece contains an identifying character (such as a number, name, or other marking that can identify a particular piece or a class of pieces), an optical character verification system 260 identifies the particular identifying character passing before the optical character verifier 260 and reports the identification to the tracking database. Further optionally, as each machine handles a particular piece, optical character verification is used to identify that the information printed on each piece is correct when compared to the sequence number of the piece as compared to the command file 230. Therefore, by comparing the optically verified characters and the location or identity of the particular page within a piece to the instructions within the command file 230, the accuracy of each piece as compared to the command file 230 is optionally reported as each piece passes a particular optical character verifier 260. Further optionally, cameras may be used to identify the progress of a job and to check the print quality and stock used for each process for a particular print or mail job. Optionally, an individual may review the images from the camera, or software may be employed to evaluate the images and alert an operator to the error, or the software may adjust the settings of the particular machine accordingly.

In another optional embodiment, once a print or service sequence has been performed for each piece in a particular print job or mail job, the completed event for each piece is recorded in the tracking database, allowing for real time tracking of the print job or mail job. For example, as each page or element within a particular piece is printed or produced, the tracking database is updated to indicate the completion of that particular task for each piece, or for each print or mail job. Then, as each piece moves through the next processing procedure, and past an electronic eye, counting apparatus, or optical character verifier, the tracking database is likewise updated for that particular step or processing procedure.

Further optionally, once a particular print sequence or other work event has been performed on all pieces within a particular job, or once an entire tray of pieces within a particular job has gone through the process, a supervisor may take the printed work, scan a particular tray or group of trays that may optionally be bar coded for tracking, and deliver the tray or group of trays to the next machine. As yet another option, the scanning and delivery of a tray or group of trays may be performed automatically to continue the processing of the pieces within the print job or mail job.

In one optional embodiment, only the first piece and the last piece in each tray are scanned, thereby allowing all of the pieces present in a tray to be linked to a particular tray. For example, a tray number or other means of identifying a particular tray may be scanned or input, along with the first piece number and the last piece number present on the tray, thereby allowing each sequential piece between those numbers to be correlated to the particular tray in which they are found. If a piece between the first piece and last piece in a tray is found to be missing, an optional electric eye may have recorded the error to the database already, recording the error or where the missing piece may be located, and thereby verifying the accuracy and location of each piece within a print job or mail job.

Further optionally, as the last piece of each tray is scanned and the missing pieces are identified, the sequence numbers in the tray are optionally compared to the command file to record which, if any, pieces are missing. Further optionally, the command file is compared to the database recordings for each piece to compare the print quality, weight, and destination barcode for each piece within the tray as it was recorded by the electronic eye, electronic scale, or other machine during the processing of each piece through the plant. Optionally, this information may be used to pre-sort each piece in a tray to allow each piece to be removed and grouped with similarly weighted pieces, or to be grouped with pieces that have similar destination barcodes, thereby allowing the pieces to be mailed at a reduced rate, or in a more organized fashion. In order to sort mail pieces appropriately, the database should be able to house the process ID (or job number), the sequence number of each piece to be mailed, the weight of each mail piece, and the destination barcode for each piece. By utilizing this information, software is optionally employed to determine which pieces of mail fit within a particular class of mail. If particular pieces fit within different classes of mail, or must be sorted to be treated differently, the information may be used to further sort out any non-similar mail from a tray, and the new tray may be tracked as well. Automated sorting systems may then be used to pull particular pieces from the mail job or print job, thereby allowing the similarly sorted pieces to be grouped together.

Further, sorting pieces may allow pieces to be routed to only the areas of the plant where the particular pieces will need processed, thereby streamlining each individual job. Optionally, such sorting may be accomplished during the processing of the print file when the file is received and processed by the automated processing system, whereby pieces of like weight or with similar destination barcodes are sequenced to be printed and/or processed together in a tray or in sequential trays.

As discussed above, each tray may optionally be tagged with an identifying label. Such a label may signify whether the pieces therein are classified as "pulled" pieces that the customer has identified as pieces that should be pulled from production, or whether such pieces were automatically pulled from the production due to machine error to be manually processed. By creating and tagging each tray for pulled items or error items for each print job or mail job, each piece can be tracked and found based upon its reason for being pulled from the process. Optionally, any piece pulled from a tray is scanned and identified in the database to explain why it was pulled. For example, a piece may be pulled because it is to be sent to a foreign destination, must be sent via full-rate or metered mail, because the piece is damaged, or because the customer has requested that the mail be removed from sending.

According to at least one embodiment of the present application, the quantity of mail pieces in a given mail tray can be calculated by taking the last sequence number, subtracting the first sequence number from it, and adding one to establish the raw count of mail pieces in the tray. Thereafter, the number of pieces scanned as pulled that existed between the first and last sequence number in the tray are subtracted from the raw count to identify the total number of pieces within a given tray.

According to at least one other embodiment of the present application, the weight of each piece may increase as additional pages or inserts are added by a printer 240 or inserter 242, thereby changing the class of mail associated with a particular piece. If the class of mail changes, then a divert tray 248 is optionally created, whereby any removed pieces are inserted into another tray 270 that is tagged with the dissimilar pieces and their sequence number within a particular job number.

Once enough trays within a particular job are created to fill a skid 280, each tray 270 within a skid 280 may be optionally scanned and identified as being related to a particular skid 280. Once the skid 280 is filled, the skid 280 is optionally wrapped to preserve its integrity, and a skid tag is optionally attached to the skid 280, allowing the skid 280 to be scanned by any shipper and allowing a customer to identify the location of each piece, and optionally to determine the last scanned time and location of a particular job and/or piece. Further optionally, an RFID device or other tracking device may be embedded with the skid 280 and correlated to the particular job, allowing tracking and reporting of the location of the skid 280 and the contents of the job at any locations where RFID devices are scanned, such as truck weigh stations or at select stopping or drop-off points.

Another optional embodiment includes taking certain pieces within a job and sending them directly to a post office or delivery service, while other pieces are picked up by another delivery service. By utilizing the optional step of sorting each piece according to the particular delivery method, each piece is optionally placed within trays that will be delivered by similar delivery methods, thereby allowing a customer to track a print job that will be delivered via divergent delivery methods. According to at least one of the optional embodiments, when a tray is to become part of the mail stream, each tray tag is stamped with a time stamp signifying when the tray is officially within the mail stream. Optionally, an optical verification device records the time stamp and records the time within the database.

According to yet another optional embodiment of the present application, the database is presented via a user interface to each customer or to operators within the printing company with information related to a specific print or mail job. For example, a graphic user interface may have a screen display that allows a user to view multiple jobs or a single job at a glance with the relevant statistics, or with customizable statistics. Optionally, only a print or mail job submitted by a particular customer is accessible to the particular customer. As will be appreciated, the real-time tracking of the particular items via a user interface provides the user, such as the customer or print company operators to utilize the data to determine the status of particular print jobs, future print jobs, the efficiency of a particular machine or operators on a particular machine, and to track important documents individually, if needed. Further, by providing any shippers with scanning devices, as well as third parties that may be employed to perform work on a particular print or mail job, skids, trays, and/or pieces may be tracked even when the pieces have left the printing facility.

According to at least one other embodiment of the present application, a user interface for evaluating the tracking data within a database includes a user interface that can be used with a handheld computer or personal digital assistant may be used by transmitting the database or interpreted versions thereof over an intranet, the Internet, or other computer network, or via wireless technology.

EXAMPLE 1

Figure 1:
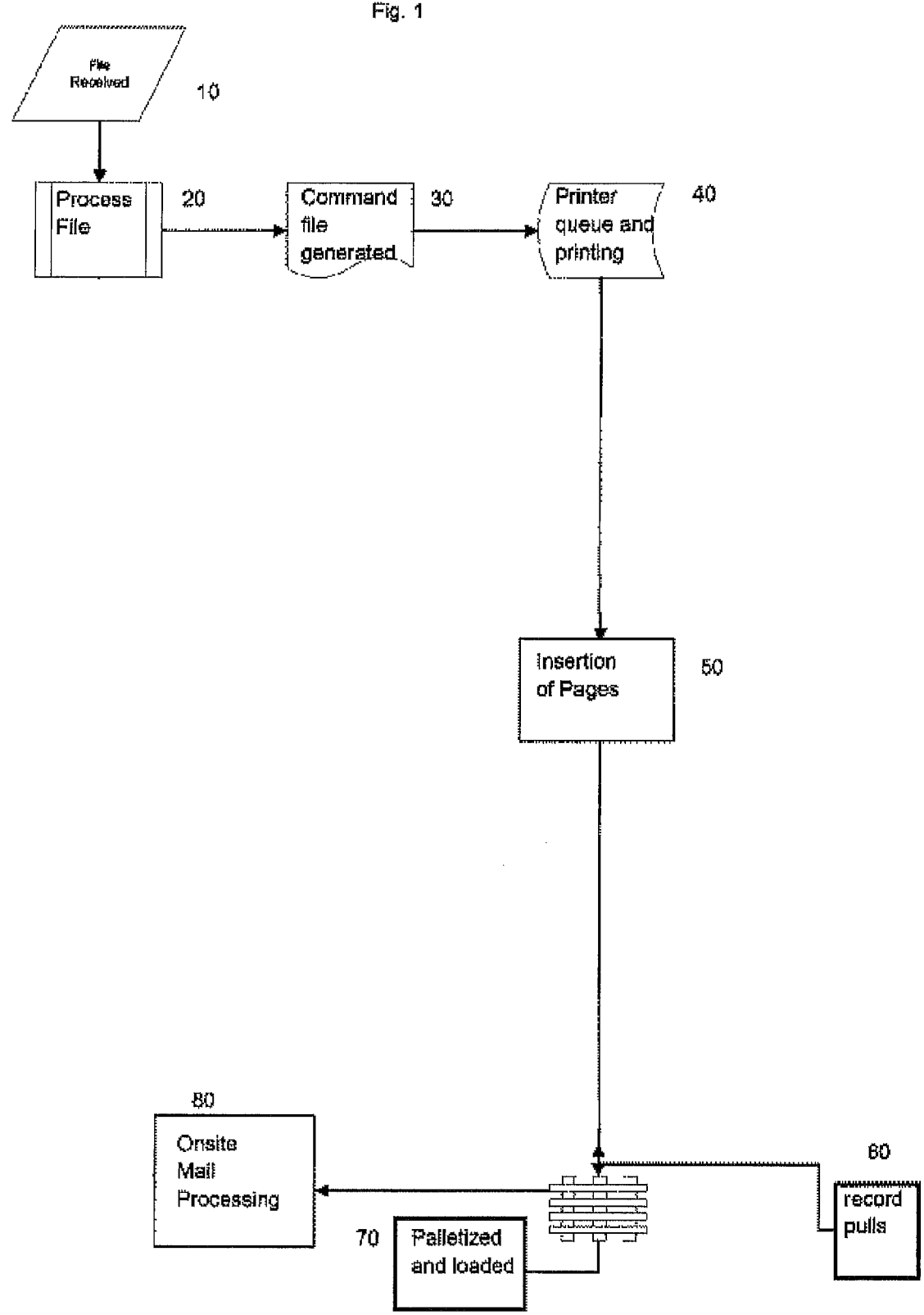
FIG. 1 is a flow diagram of a system for tracking print and/or mail jobs according to at least one embodiment of the present application.

Turning to FIG. 1, according to at least one exemplary embodiment, a system for monitoring document production jobs comprises a step 10 of receiving a print file at a processor that is in communication with a document production center; processing the print file. It will be appreciated that the print file may be processed in a step 20, comprising merely printing the documents specified in the print file according to the specifications listed therein, and/or optionally, the print file may be processed into a command file in step 30, whereby the specifications in the print file are converted to establish each machine or processor that will be needed for a particular document production job, establish the order of the document production job through the document production center (including any off-site processing or printing), and provide a set of commands for each machine or processor to be utilized in the document production job. Thereafter, in step 40 any command file instructions to be carried out at a specified printer are sent in a printer queue for the specified printer, and each document specified in the document production job is printed.

Thereafter, in step 50, any command file instructions to be carried out at a specified inserter are sent in an inserter queue, and the relevant portions of a particular document to be inserted at the specified inserter are processed. As each document is printed and/or assimilated in steps 40 and 50, each document is placed in a tray and the tray is labeled with the first document number in the tray and the last document number in the tray. As each tray is filled, the tray identity and the first and last document are reported to a processor to record the location of the tray and the document identities in each tray. Optionally, if multiple trays are used, each tray is numbered and placed on a pallet in succession, with each pallet being numbered and identified with the first and last tray on the pallet. By identifying the first and last document on each tray, and the trays on each pallet at specified points in document production center or at off-site locations, and reporting this information to the processor, a user can identify the location of each document in the document production job, and can identify the production status of each job. At each of these steps, a step 60 is optionally included wherein any documents that have been intentionally pulled from the production line either at the request of the client requesting the document production job or due to machine error are recorded and submitted to the processor. Further optionally, a separate tray for documents pulled from the production line is created and identified such that each document in the tray is recorded and linked to that tray in the processor database, thereby allowing the processor to reconcile the location and status of each document in the print file. Further, as an option, a step 70 may be included, wherein each tray is palletized and optionally wrapped, and loaded into a truck or shipping container to be sent to a mailhouse. Another option includes step 80, wherein an on-site mail processing facility is utilized to finalize and sort each completed document into particular price categories, and where each document is then optionally entered into the mail or shipping stream.

EXAMPLE 2

Figure 2:
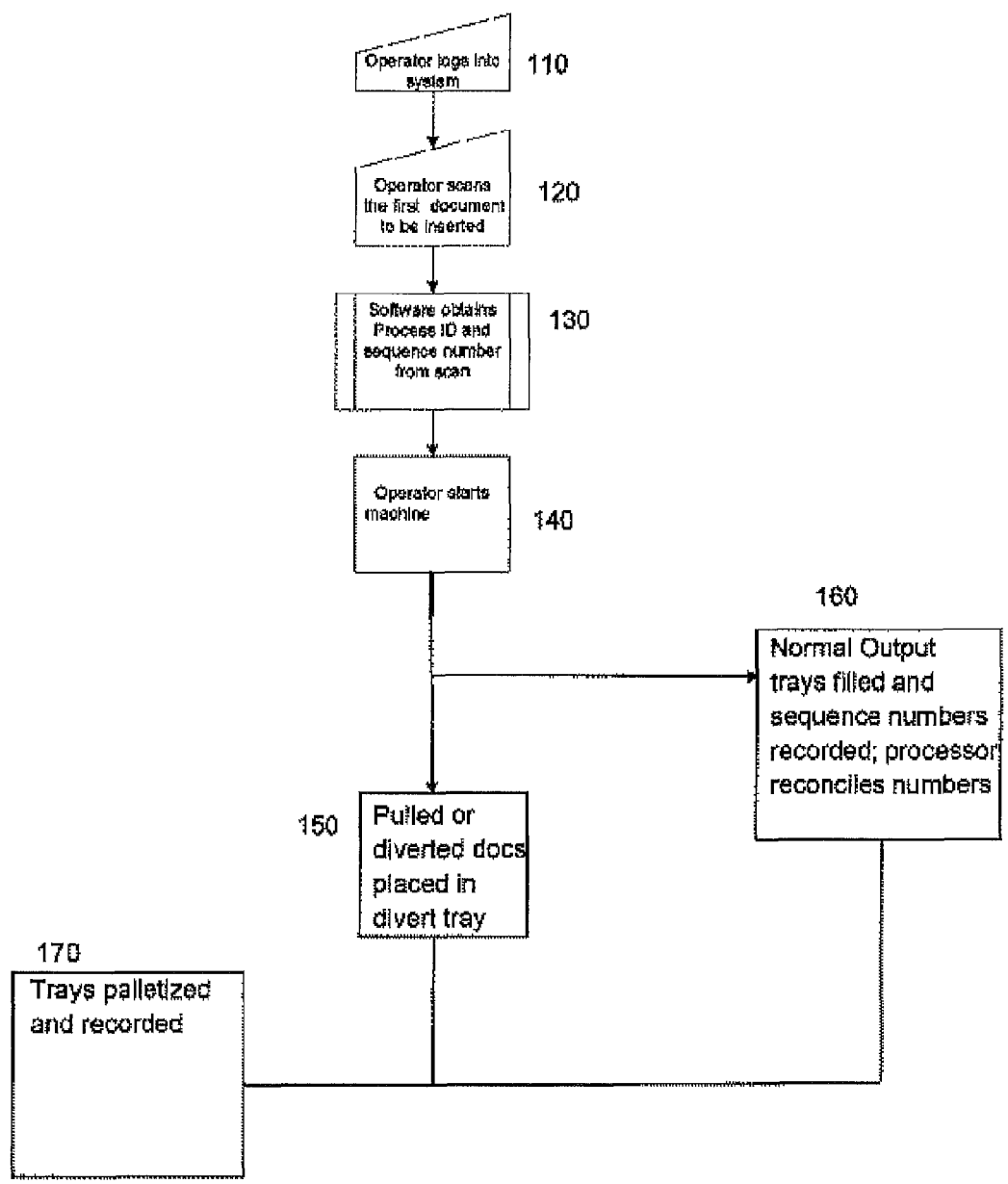
FIG. 2 is a flow diagram of a system for reconciling documents diverted from a print or mail job according to at least one embodiment of the present application.

Turning now to FIG. 2, according to at least one embodiment, a system for monitoring document production jobs comprises a step 110 wherein an operator logs onto a processor. Thereafter, in step 120 the operator or an automated machine scans a first document portion to be processed. In step 130, first document portion scanned is identified and compared to the command file, thereby creating a log of the first document scanned against the command file and identifying the processing sequence for the scanned document and the documents following the scanned document. Thereafter, in Step 140, the document processing begins, either through inserting and/or collating document portions with one another, inserting document portions into an envelope 246 (as shown in FIG. 3), or further processing the document according to the specifications of the command file and print file. During step 140, if a machine or operating step fails on a particular document in the sequence, or if a document is identified by the command file or print file as a document that should be removed from the sequence, in step 150, the document is removed from the operation and is placed in a tray identified as a divert tray. Each document placed in the divert tray is scanned and identified as being associated with the divert tray. For documents that are not diverted, each document is processed and output into a tray, wherein the document sequence number of at least the first document and the last document is scanned and linked to the serial number of the tray when the tray is full or when no more documents are to be produced. Thereafter, in step 160, the processor determines the quantity of documents within a tray, and then compares the raw count of the documents in each tray and reconciles the number of documents therein with each document identified in step 150 as being diverted, thereby ensuring that each document identified in the print file is accounted for. Thereafter, once all documents have been produced, and all diverted documents are either processed by hand or removed as requested by the client, all the trays for a particular document production are placed on a pallet and scanned as to their location for either shipment, mailing, or further processing, as indicated in step 170.

Although the embodiments above have been described in detail with reference to preferred embodiments, variations and modifications exist within the scope and spirit of the invention as described and defined in the specification.

What is claimed is:

1. A system for monitoring document production jobs comprising:
    at least one processor in communication with a document production center;
    an electronic print file operable to be interpreted by the at least one processor, and further operable to define specifications for each document identified in a document production job, wherein said print file is operable to define the order in which each document identified in the document production job is produced;
    at least one document counting apparatus located within a production path of the document production center and in communication with the at least one processor, the document counting apparatus operable to count each page processed within a document production job and communicate the count of each page to the processor;
    plurality of trays operable to hold a predescribed number of documents, and further operable to hold the plurality of documents as the system moves the plurality of trays within the production path; and
    a program operable to identify the approximate location of a particular document in the document production center by correlating the number of pages counted by the at least one document counting apparatus with the print file.

2. A system for monitoring document production jobs comprising:
    at least one processor in communication with a document production center;
    an electronic print file operable to be interpreted by the at least one processor, and further operable to define specifications for each document identified in a document production job, wherein said print file is operable to define the order in which each document identified in the document production job is produced;
    at least one document counting apparatus located within a production path of the document production center and in communication with the at least one processor, the document counting apparatus operable to count each page processed within a document production job and communicate the count of each page to the processor;
    plurality of trays operable to hold a predescribed number of documents, and further operable to hold the plurality of documents while the plurality of trays are moved within at least a portion of the production path; and
a program operable to identify the approximate location of a particular document in the document production center by correlating the number of pages counted by the at least one document counting apparatus with the print file.

3. The system of claim 2, wherein each document identified in the print file for a document production job includes at least one identifying character, the system further comprising at least one optical character verification device operable to identify the at least one identifying character and communicate the identification of the at least one identifying character to the at least one processor.

4. The system of claim 3, wherein the program is further operable to identify the approximate location of a particular document by correlating the identification of the at least one identifying character by the optical character verification device with the print file.

5. The system of claim 2, further comprising a command file created from the print file by the at least one processor, wherein the command file identifies the production path of the production job and specifies each piece of equipment to be used for the production job.

6. The system of claim 5, further comprising at least one printer operable to print at least a portion of the document production job.

7. The system of claim 6, further comprising at least one inserting device operable to insert portions of a predescribed document in an order set by the command file.

8. The system of claim 2, wherein the specifications for each document identified in a document production job comprise customized information.

9. The system of claim 2, wherein the specifications for each document identified in a document production job comprise the number and sequence of inserts.

* * * * *